United States Patent [19]

Allen

[11] Patent Number: 5,156,484
[45] Date of Patent: Oct. 20, 1992

[54] RAFTER REINFORCEMENT DEVICE

[76] Inventor: Ronald Allen, 5002 E. Chilkoot Ave., Tampa, Fla. 33617

[21] Appl. No.: 739,171

[22] Filed: Aug. 1, 1991

[51] Int. Cl.$^5$ ............................................. F16B 7/00
[52] U.S. Cl. .................................. 403/295; 403/402; 403/403; 52/639
[58] Field of Search ............... 403/295, 403, 401, 382, 403/205, 402, 363, 178; 52/93, 639, 634, 633, 643

[56] References Cited

U.S. PATENT DOCUMENTS

| | | | |
|---|---|---|---|
| 1,729,586 | 9/1929 | Liebman | 403/295 |
| 2,941,635 | 6/1960 | Harris | 52/634 |
| 3,304,108 | 2/1967 | Hamilton et al. | 403/295 |
| 3,414,300 | 12/1968 | Spane | 403/402 X |
| 4,024,691 | 5/1977 | Hansen et al. | 403/402 X |
| 4,127,347 | 11/1978 | Pritchard | 403/295 X |
| 4,315,386 | 2/1982 | Clarke | 403/295 X |
| 4,943,180 | 7/1990 | Durhman | 403/295 |

Primary Examiner—Peter M. Cuomo
Attorney, Agent, or Firm—Pettis & McDonald

[57] ABSTRACT

A rafter reinforcement device for strengthening structural joints that are primarily of the type used to connect sections of hollow rafters in roof support systems. The rafter system to be reinforced includes a pair of "U"-shaped members, each of which are composed of two segments that are joined at an angle. The "U"-shaped members are nested together creating a space to receive the reinforcement device. The reinforcing device includes a pair of "U"-shaped channels, each composed of two parts that are joined at an angle that is substantially the same angle as that defined by the rafter segments. The channels are nested with one another so that the web of each channel is opposed and spaced apart from the web of the other channel. The nested channels are sized and configured to be received by the hollow rafter at the structural joint of the rafter.

8 Claims, 3 Drawing Sheets

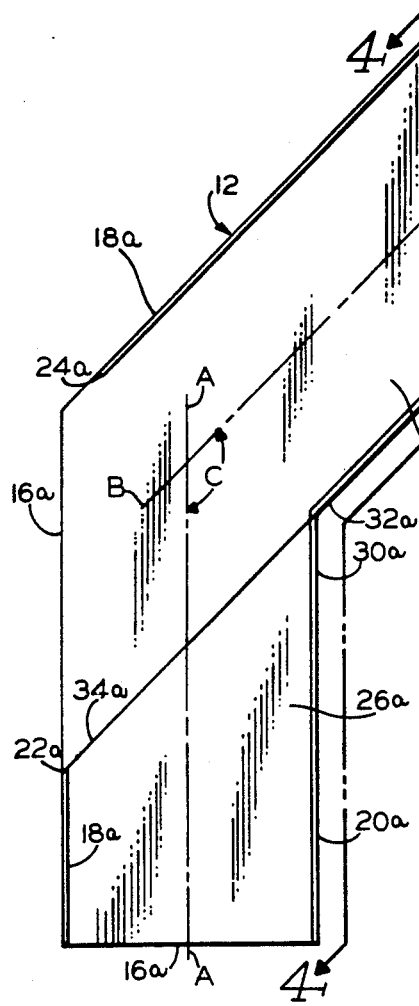
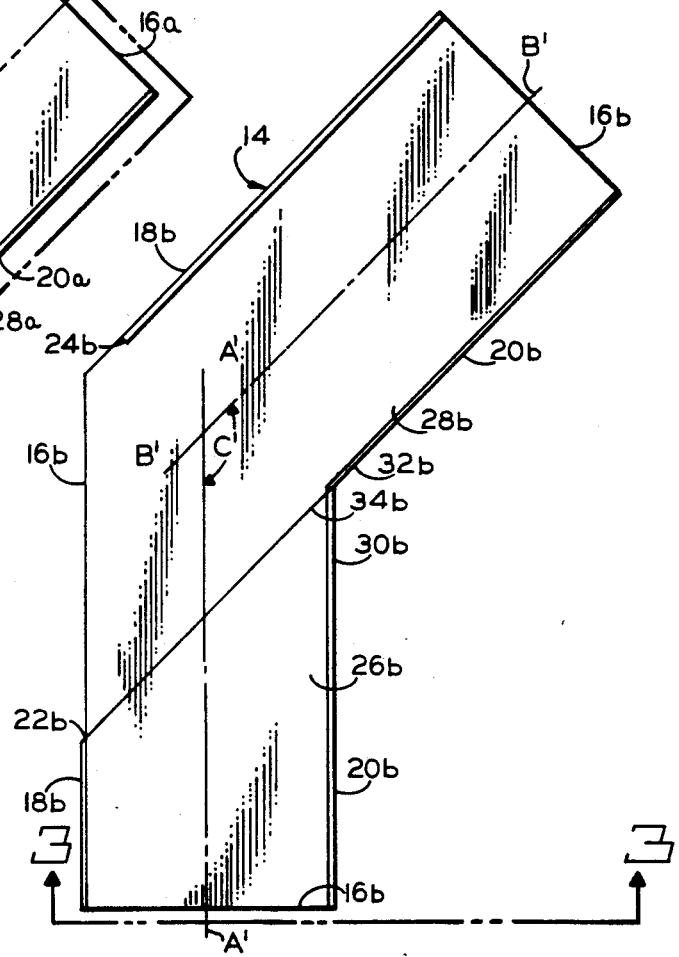
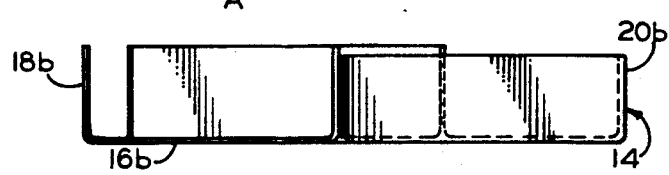
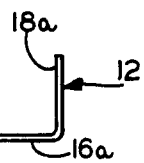

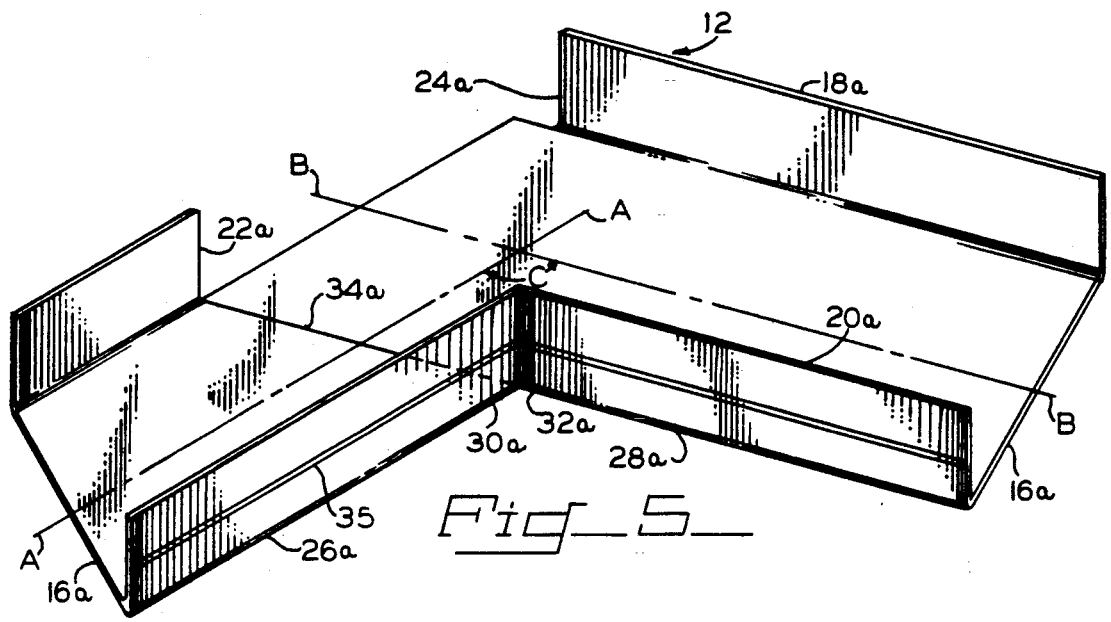
Fig_5_
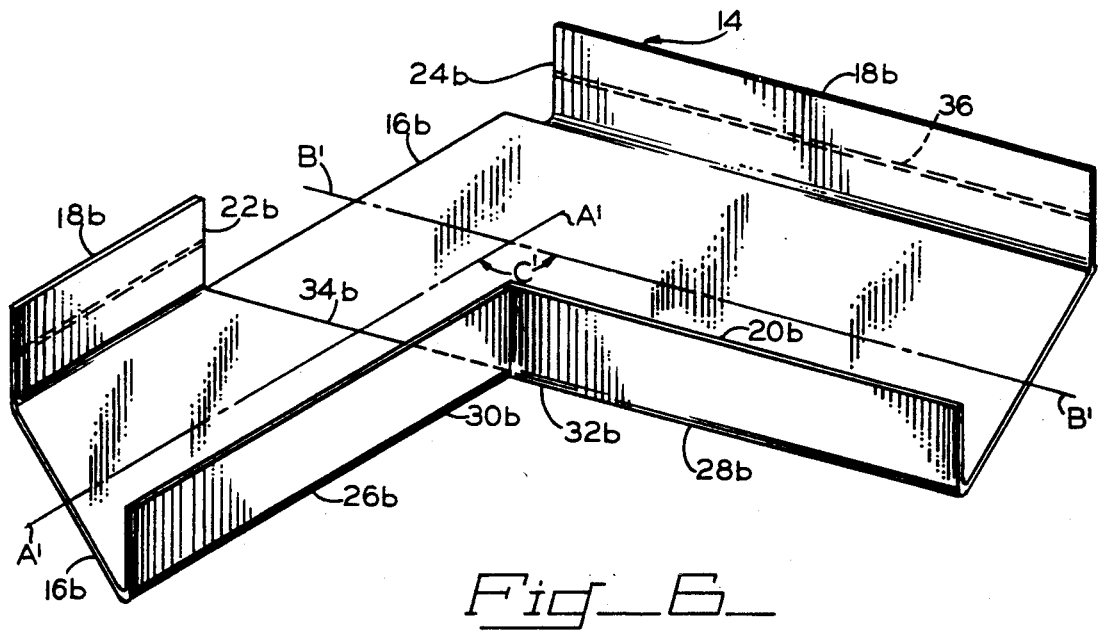
Fig_6_

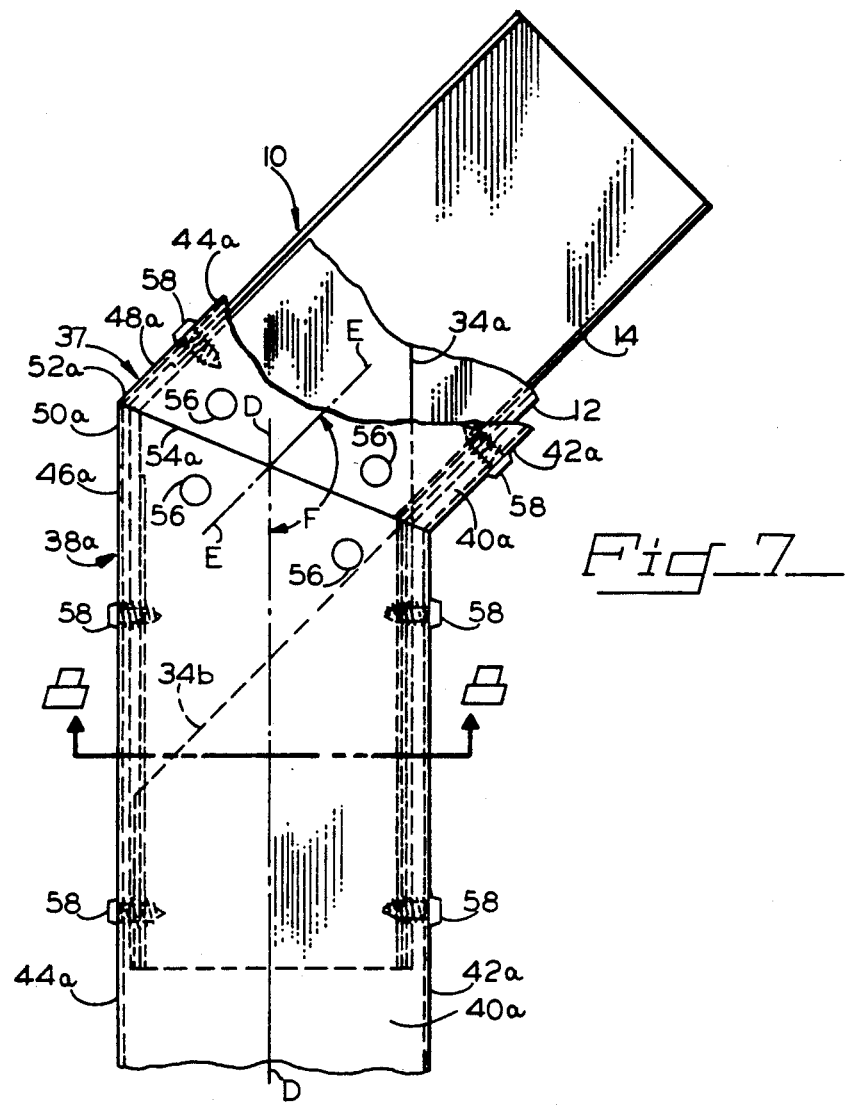
Fig_7_
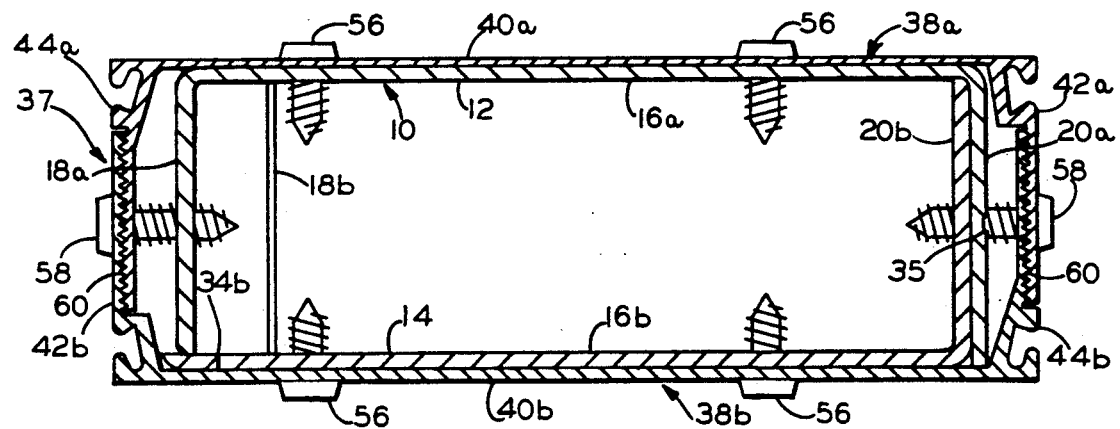
Fig_8_

RAFTER REINFORCEMENT DEVICE

BACKGROUND OF THE INVENTION

1. Field of the Invention

The present invention relates to a rafter reinforcement device used primarily in the construction of prefabricated modular building systems that utilize hollow beams. More particularly the rafter reinforcement device strengthens the structural joints between sections of hollow rafters.

2. Description of the Prior Art

The construction industry, as a means for reducing the amount of material used in construction of prefabricated buildings, has developed hollow metal beams to be used in building wall and roof support systems. Attaching sections of these hollow beams together has frequently resulted in joints that have inadequate strength or rigidity for the uses intended. Over the years a number of different methods have been devised to provide a means for strengthening these joints and beams.

U.S. Pat. No. 3,786,612 issued to Baker illustrates one such method of reinforcement. This patent discloses both a tubular connector and a plate connector for modular box beams, which are inserted within the angled joint of modular box beams. The structure of the reinforcement system of the current invention, which comprises two nested "U"-shaped channels, is different from both the tubular and the plate connectors of Baker.

U.S. Pat. No. 3,304,108 issued to Hamilton et al. discloses another method for reinforcing connections between tubular structures. The structure disclosed is inserted within the hollow tubes at the tubular joints. The structure is comprised of two parts that interfit with both arms of one structure inserted between both arms of the other structure. The current invention is used to reinforce a rafter joint and comprises two nested channels that have a different configuration than Hamilton's structure.

Another method is disclosed by Pestoor in U.S. Pat. No. 4,368,998, which discloses a tube assembling device for coupling hollow tubes. The device is comprised of a member having a number of arms projecting therefrom. One difference, among others, between this construction and the current invention, is that only the arms are inserted within the hollow tubes.

U.S Pat. No. 4,305,677 issued to Kowalski discloses a pair of "U"-shaped beams attached end to end being reinforced by a third smaller "U"-shaped beam that is nested within the first two beams so that it extends across the end joint. The beams are nested so that the flanges are adjacent one another. The structure of the reinforcement system of the current invention utilizes two nested "U"-shaped beams which are inserted within a hollow beam, and thus discloses a different structure from that of Kowalski.

The current invention, by utilizing two nested "U"-shaped channels, provides at least two layers of material across the plane of the joint receiving the greatest stress. This reinforcement device provides a simple means for increasing the strength of a rafter joint along its weakest planes.

SUMMARY OF THE INVENTION

The present invention relates to a rafter reinforcement device used to strengthen structural joints that are primarily the type used to connect sections of hollow rafters in roof support systems. Typically, the reinforcing device is installed in a hollow rafter that is comprised of a pair of "U"-shaped members. Each member is comprised of two segments; each segment having a first end and a longitudinal axis. The first ends of the two segments are attached to one another to create a structural joint in which the longitudinal axes of the segments define a predetermined angle. The pair of members are nested with one another so that a space is defined within the nested members creating a hollow rafter.

The reinforcing device is comprised of a pair of "U"-shaped channels which are received by the hollow rafter in the defined space. Each channel is comprised of a web and two flanges. One flange of each channel extends a greater distance from the channel web than the other flange extends from the web, defining flanges of unequal length. Each channel also comprises a first and a second part, and each part has a first end and a longitudinal axis. The first and second parts are attached to one another at their first ends to create a joint so that the longitudinal axes define a predetermined angle that is substantially the same angle as that defined by the axes of the rafter segments. The channels are nested with one another such that the webs of each channel are opposed to one another and are spaced apart by the flanges of the channels. The shorter flange of each channel is interposed between the flanges of the other channel when the channels are nested. The nested channels are sized and configured to be received by the hollow rafter at the joint of the rafter.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a plan view of a preferred embodiment of one channel.

FIG. 2 is a plan view of a preferred embodiment of the other channel.

FIG. 3 is an elevational view of the channel of FIG. 2 taken along line 3—3 of FIG. 2.

FIG. 4 is an elevational view of the channel of FIG. 1 taken along line 4—4 of FIG. 1.

FIG. 5 is a perspective view of the channel shown in FIG. 1.

FIG. 6 is a perspective view of the channel shown in FIG. 2.

FIG. 7 is a plan view of a preferred embodiment of the rafter, with a portion of that rafter broken away to illustrate the insertion of the reinforcing device within the rafter.

FIG. 8 is a cross sectional view taken along line 8—8 of FIG. 7.

Similar reference characters refer to similar parts throughout the several views of the drawings.

DETAILED DESCRIPTION

A preferred embodiment of the reinforcing device is illustrated in drawing FIGS. 1–8. The reinforcing device is generally indicated as 10 in FIG. 7 and FIG. 8.

The reinforcing device 10 comprises two "U"-shaped channels 12 and 14. As can be seen in FIGS. 1-6 in the preferred embodiment, channel 12 and channel 14 are very similar in construction. Each channel comprises a web 16 (16a for channel 12 and 16b for channel 14) and a first flange 18 (18a for channel 12 and 18b for channel 14) and a second flange 20 (20a for channel 12 and 20b for channel 14). In the preferred embodiment, in channel 12, flange 18a is discontinuous between edge 22a and edge 24a. In channel 14 flange 18b is discontinuous between edge 22b and edge 24b. The discontinuity is caused by the means of the preferred fabrication method for channels 12 and 14. Channels 12 and 14 are comprised of a first part 26a and 26b respectively, each of which has a longitudinal axis A and A' respectively, and a second part 28a and 28b respectively each of which has a longitudinal axis B and B' respectively. In the preferred embodiment each part 26a, 26b, 28a and 28b is a "U"-shaped extrusion composed of aluminum or other suitable material that provides the strength necessary for the particular use for which the rafter system is designed. Parts 26a and 26b each have a first end 30a and 30b respectively and parts 28a and 28b each have a first end 32a and 32b respectively which are joined at a joint 34a and 34b respectively. Each pair of longitudinal axes A and B and A' and B' define a predetermined angle C and C' respectively. The discontinuities of flanges 18a and 18b are created by the end of the second part 28a of channel 12 being open and the end of the second part 28b of channel 14 being open. In other embodiments the channels may be fabricated such that flanges 18a and 18b are continuous.

Channel 12 and channel 14 are nested with one another such that the webs 16a and 16b are opposed to one another and are spaced apart from one another by the flanges 18a, 18b, 20a, and 20b. Because the webs 16a and 16b are generally the same width, one flange of each channel is interposed between the flanges of the opposing channel, which is illustrated in FIGS. 7 and 8. In FIG. 8 channel 12 has been nested with channel 14 so that flange 18a of channel 12 is interposed between channels 18b and 20b of channel 14. Thus, flange 20b of channel 14 is interposed between flanges 18a and 20a of channel 12. Flange 20a of channel 12 extends from web 16a a greater distance than flange 18a of channel 12. Flange 18b of channel 14 extends outwardly from web 16b of channel 14 a greater distance than flange 20b extends from web 16b of channel 14. Flanges 18a, 20a, 18b, and 20b extend from web 16a and 16b. respectively at generally right angles to web 16a or 16b. The longer flanges, flange 20a of channel 12 and flange 18b of channel 14, each have a recessed portion that distinguishes that flange from the other flange 18a and 20b respectively. In the preferred embodiment the recessed portion in flange 18a comprises a linear depression 35 that extends longitudinally the full length of flange 20a of channel 12. A linear depression 36 extends longitudinally the full length of flange 18b of channel 14. When the channels are nested as shown in FIGS. 7 and 8 it can be seen that the joint 34a of channel 12 is oblique to joint 34b of channel 14.

The rafter system shown generally as 37 in FIG. 7 and FIG. 8, in which the reinforcing device 10 is inserted, is comprised of a pair of "U"-shaped members 38a and 38b. Each member is comprised of a web 40a and 40b, a first flange 42a and 42b and a second flange 44a and 44b respectively. Member 38a is comprised of a first segment 46a and a second segment 48a. The first segment 46a has a first end 50a and the second segment 48a has a first end 52a. A joint 54a is formed in member 38a when the first end 50a of the first segment 46a is joined with the first end 52a of the second segment 48a such that the longitudinal axes D and E define a predetermined angle F. Similarly, member 38b is comprised of a first segment (not shown) and a second segment (not shown). The first segment has a first end (not shown) and the second segment has a first end (not shown). A joint (not shown) is formed when the first end of the first segment is joined with the first end of the second segment, such that the longitudinal axes of the segments define a predetermined angle (not shown) that is generally the same angle as angle F. The hollow rafter is formed by nesting the "U"-shaped members 38a and 38b such that the webs 40a and 40b are opposed to one another and are spaced apart by the flanges 42a, 42b, 44a, and 44b creating a space therein.

The reinforcing device 10, the nested "U"-shaped channels 12 and 14, is sized and configured to be received by the rafter system 37 at the rafter joint 54a. For the reinforcing device 10 to be properly configured, angles C and C' must generally equal angle F.

In the preferred embodiment, as shown in FIGS. 7 and 8, web 16a of channel 12 is attached to web 40a of member 38a. Web 16b of channel 14 is attached to web 40b of member 38b, flanges 42a and 44b are attached to flanges 20a and 20b and flanges 44a and 42b are attached to flanges 18a and 18b. In the preferred embodiment threaded screw fasteners 56 ar used to join the webs and threaded screw fasteners 58 are used to join the flanges, however, any suitable fastening means may be used.

Having thus set forth a preferred construction for the rafter reinforcement device 10 of this invention, it is to be remembered that this is but a preferred embodiment. Attention is now invited to a description of the use of the reinforcing device 10. The rafter reinforcement system is used primarily for strengthening rafter joints in prefabricated buildings. The rafter system 37 may incorporate a self-locking means 60 between flanges 42a and 44b and between flanges 42b and 44a. When the reinforcing system is assembled, the "U"-shaped members 38a and 38b are separated to allow access to the "U"-shaped members. The nested "U"-shaped channels 12 and 14 are then placed within one of the "U"-shaped members, for example 38b, at the joint 54. The second "U"-shaped member 38a is then placed over the reinforcing device 10 so that the flanges 42a and 44b interlock and the flanges 42b and 44a interlock. The reinforcing device 10 is held in place by the threaded fasteners 56 and 58.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:
1. A rafter reinforcement device for strengthening structural joints that are primarily of the type used to connect sections of hollow rafters in roof support systems comprising:

a hollow rafter comprising:
- a pair of "U"-shaped members, each member having two segments, each segment having a first end and a longitudinal axis;
- a structural joint created by joining said first ends of said segments such that said longitudinal axes of said segments define a predetermined angle;
- said pair of members being nested with one another such that a space is defined therein; and a pair of "U"-shaped channels received by said hollow rafter;
- each said channel comprising a web and a first and a second flange, one said flange of each said channel extending from said web a greater distance than the other said flange extends from said web;
- each said channel further comprising a first and a second part, each said part having a first end and a longitudinal axis,
- a pair of joints created by joining said first ends of said first and second parts of each respective said channel such that said longitudinal axes define a predetermined angle that is substantially the same angle as that defined by said axes by said segments of said rafters;
- at least one said flange of each said channel being continuous at said joint;
- said channels being nested with one another such that said webs of each said channel are opposed to one another and are spaced apart by said flanges of said channels and one said flange of each channel being interposed intermediate said flanges of said other channel;
- said nested channels being sized and configured to be received by said hollow rafter at said joint of said rafter.

2. A rafter reinforcement system as in claim 1 wherein each said member comprises a web and two flanges, said members being nested with one another such that said webs of each said member are opposed to one another and are spaced apart by said flanges of said member.

3. A rafter reinforcement system as in claim 2 wherein each said web of each said nested channel is attached to said adjacent web of said member.

4. A rafter reinforcement system as in claim 2 wherein each said flange of each said nested channel is attached to said adjacent flanges of said member.

5. A rafter reinforcement system as in claim 1 wherein one said flange of at least one said channel further comprises a recess, whereby said recess distinguishes said one flange of said channel from the other said flange of said channel.

6. A rafter reinforcement system as in claim 1 wherein at least one portion of one said flange of each said channel is discontinuous.

7. A rafter reinforcement system as in claim 6 wherein when said channels are nested, said discontinuous portion of said flange of one said channel is nested adjacent a continuous portion of said flange of said other channel.

8. A rafter reinforcement system as in claim 1 wherein said joints of each said channel are oblique to one another when said channels are nested.

* * * * *

UNITED STATES PATENT AND TRADEMARK OFFICE
CERTIFICATE OF CORRECTION

PATENT NO.   :   5,156,484
DATED        :   October 20, 1992
INVENTOR(S)  :   Ronald Allen It is certified that error appears in the above-identified patent and that said Letters Patent is hereby corrected as shown below:

Claim 1, column 5, line 27, "by" should be --of--.

Signed and Sealed this

Thirtieth Day of November, 1993

Attest:

BRUCE LEHMAN

*Attesting Officer*                    *Commissioner of Patents and Trademarks*